United States Patent [19]

Deguchi et al.

[11] Patent Number: 4,881,216

[45] Date of Patent: Nov. 14, 1989

[54] OPTICAL HEAD IN AN OPTICAL MEMORY DEVICE

[75] Inventors: Toshihisa Deguchi; Yoshikazu Fujii; Tetsuya Inui, all of Nara; Kenji Ohta, Yao; Schohichi Katoh, Yamatokoriyama, all of Japan

[73] Assignee: Sharp Kabushiki Kaisha, Osaka, Japan

[21] Appl. No.: 237,652

[22] Filed: Aug. 26, 1988

Related U.S. Application Data

[63] Continuation of Ser. No. 839,197, Mar. 13, 1986, abandoned.

[30] Foreign Application Priority Data

Mar. 13, 1985 [JP] Japan .................................. 60-50788

[51] Int. Cl.⁴ ..................... G11B 7/00; G11B 21/08; G11B 21/10
[52] U.S. Cl. ........................... 369/54; 369/44; 369/106; 369/116
[58] Field of Search ................ 369/54, 44, 45, 46, 369/106, 111, 116; 250/201, 202

[56] References Cited

U.S. PATENT DOCUMENTS

| | | | |
|---|---|---|---|
| 3,944,727 | 3/1976 | Elliott | 369/111 |
| 4,051,329 | 9/1977 | Blondet | 369/54 |
| 4,145,758 | 3/1979 | Drexler | 369/44 |
| 4,357,696 | 11/1982 | Bierhoff | 369/45 |
| 4,363,116 | 12/1982 | Kleuters | 369/45 |
| 4,446,545 | 5/1984 | Dijk | 369/46 |
| 4,549,190 | 10/1985 | Ohara | |
| 4,627,725 | 12/1986 | Nishio | 369/46 |
| 4,642,803 | 2/1987 | Drexler | 369/111 |
| 4,654,839 | 3/1987 | Endo | 369/116 |

FOREIGN PATENT DOCUMENTS 2537319 8/1984 France .

OTHER PUBLICATIONS

Japanese Abstract vol. 6, No. 258, (P-163) (1136), Dec. 17, 1982.
Japanese Abstract vol. 7, No. 160, (P-120) (1305), Jul. 14, 1983.

Primary Examiner—Steven L. Stephan
Attorney, Agent, or Firm—Birch, Stewart, Kolasch & Birch

[57] ABSTRACT

In an optical head of an optical memory device which records, reproduces or erases information onto or from a recording medium by applying a laser beam to the recording medium, a beam splitter is disposed in an optical path to conduct a portion of the laser beam emitted from a laser device to a light detector. In accordance with a detected value from this light detector, the influence of a stray beam generated in an optical system is removed from a servo error signal.

16 Claims, 2 Drawing Sheets

OPTICAL HEAD IN AN OPTICAL MEMORY DEVICE

This application is a continuation of application Ser. No. 839,197 filed on Mar. 13, 1986, now abandoned.

BACKGROUND OF THE INVENTION

1. Field of the Invention

The present invention relates to an optical memory device which records, reproduces or erases information onto or from a recording medium by applying a light beam such as a laser beam to the recording medium. More particularly, the present invention is concerned with an optical head in such an optical memory device.

2. Description of the Related Art

Extensive studies have recently been made about the potential use of an optical memory device as a high density storage, a high capacity storage having high speed accessing. As examples of such an optical memory device there are a memory device in which a row of fine pits are formed in a recording medium and the diffraction phenomenon of light beam at the pit portions is utilized for the reproduction of information, and a memory device in which bit-shaped areas having different refractive indices are formed on a recording medium and variations in reflectance or transmissivity are utilized for the reproduction of information.

Those optical memory devices are each provided with an optical head, in which there are performed a focus control and a tracking control for a radiated light beam relative to a recording medium by means of a servo control unit. FIG. 1 shows a construction of an optical system for this optical head, in which an isolator is formed by a polarization beam splitter 104 and a quarter-wave plate 105 to prevent a light beam reflected from a recording medium 101 from returning to a laser device 102 and to conduct the reflected beam efficiently to a servo signal detector or information signal detector 103. In this construction, the portion of the reflected beam remaining on the surfaces of such optical elements as the beam splitter 104 and quarter-wave plate 105 (such residual reflected beam will hereinafter be referred to as "stray beam") mostly returns to the laser device 102, with only a very small quantity of light beam reaching the servo signal detector 103, which is negligible as disturbance influencing a servo signal in the case where the reflectance of a recording medium is high as in VD (Video Disc) or CD (Compact Disc).

However, where the reflectance of a recording medium is low, or in the case of an optical head in which it is difficult to introduce such an isolator as shown in FIG. 1, e.g. an optical head for an optomagnetic recording device, if the residual reflectance on the surface of an optical element cannot be suppressed below a certain level, a stray beam on the surface is added as offset to a servo signal, thus causing problems; for example, the control for the optical head becomes unstable or it becomes difficult to effect mounting and adjustment of a light detector for servo control.

OBJECTS AND SUMMARY OF THE INVENTION

1. Objects of the Invention

The present invention has been accomplished in view of the above-mentioned circumstances and it is the object thereof to provide an optical head capable of eliminating the influence of a stray beam generated in an optical system thereby improving servo characteristics.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

2. Summary of the Invention

An optical head in an optical memory device according to the present invention used for recording, reproducing or erasing information by applying a laser beam to a recording medium is of a construction which includes a beam splitter and a light detector disposed in an optical path to conduct a portion of a laser beam emitted from a laser device to the light detector. Since a portion of the emitted laser beam is detected and the influence of a stray beam generated in an optical system is removed from a servo error signal in accordance with the detected value, there is no longer a deviation of a target value in servo control induced by a difference in reflectance of recording mediums or a difference in the quantity of light beam emitted from a laser device, thus permitting a stable control for the optical head. According to the present invention, therefore, it is possible to provide an optical head which is applicable to recording mediums having various optical characteristics.

BRIEF DESCRIPTION OF THE DRAWINGS

The present invention will be better understood from the detailed description given hereinbelow and the accompanying drawings which are given by way of illustration only and thus are not limitative of the present invention and wherein.

DESCRIPTION OF THE PREFERRED EMBODIMENT

Figure 1:
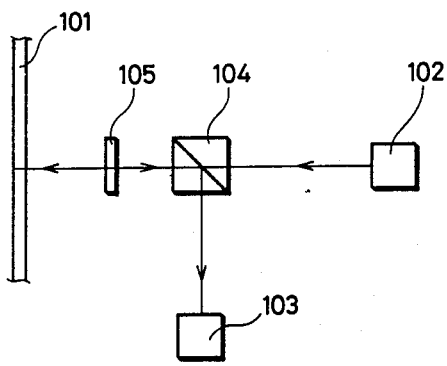
FIG. 1 is a schematic view of an essential part of a conventional optical head.
Figure 2:
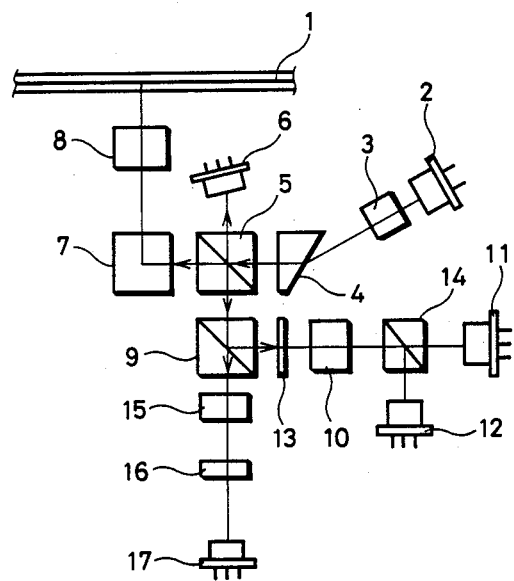
FIG. 2 is a schematic view of an essential part of an optical head according to an embodiment of the present invention.

FIG. 2 shows a schematic construction of an optical head for an opto-magnetic recording device, embodying the present invention, in which the reference numeral 1 denotes a magnetic recording medium having a vertical magnetic anisotropy. The optical head is provided with a semiconductor laser 2 which emits a predetermined laser beam, a collimator lens 3 which converts the emitted laser beam into a collimated beam, and a shaping prism 4 for converting the laser beam emitted from the semiconductor laser 2, which beam is elliptic, into a generally circular laser beam.

A polarization beam splitter 5 functions to improve the polarization of transmitted beam and further rotate the polarization direction of reflected beam thereby increasing an apparent magneto-optic rotation angle. It also serves to conduct a portion of the emitted laser beam to later-described light detectors 6, 11, 12 and 17. The light detector 6 receives a portion of the laser beam reflected by the polarization beam splitter 5 and it is somewhat inclined relative to an optical path so that the reflected beam from the surface of this light sensing element may not become a stray beam. The optical head is further provided with a total reflection prism 7 functioning to bend by 90° an optical path of the laser beam which has passed through the polarization beam splitter 5, and an objective lens 8 for forming a fine spot of the laser beam on the magnetic recording medium 1. The objective lens 8 is controlled by a later-described servo control system to adjust the focus and position of a light spot formed on an information track of the magnetic recording medium 1.

The optical head is also provided with a polarization beam splitter 9 which functions to increase the magneto-optic rotation angle relative to the reflected beam like the polarization beam splitter 5, a spot lens 10 for applying the reflected information beam from the polarization beam splitter 9 onto the light detectors 11 and 12 at predetermined size and shape, and a half-wave plate 13 which rotates the polarization direction of the information beam in a middle direction between S and P axes of a polarization beam splitter 14 serving as an analyzer.

Further provided are a spot lens 15 and a cylindrical lens 16 having a focal line inclined by 45° with respect to a tangential direction of the track on the magnetic recording medium 1. A composite element type light detector 17 is also provided which has four light sensing elements. Using these light sensing elements and under a synergistic effect of both the spot lens 15 and the cylindrical lens 16, the light detector 17 not only detects a change of a relative distance between the magnetic recording medium 1 and the objective lens 8 but also detects a positional deviation between the light spot and the information track on the magnetic recording medium 1.

Figure 3:
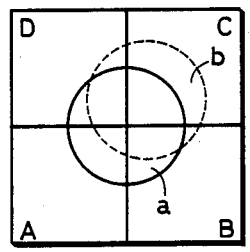
FIG. 3 is a schematic view showing a reflected information beam and a stray beam both present on a light detector used in the embodiment of the invention.

FIG. 3 schematically shows the presence of an information beam "a" reflected from the magnetic recording medium and a stray beam "b" both on the composite element type light detector 17. A servo error signal or focus error signal $F_E$ and a tracking error signal $T_E$ are influenced by the stray beam. According to the construction of this embodiment, the focus error signal $F_E$ and the tracking error signal $T_E$ are obtained by an astigmatism method and a push-pull method, respectively. More specifically, the focus error signal $F_E$ and the tracking error signal $T_E$ are obtained from outputs SA, SB, SC and SD of the four light sensing elements A, B, C and D of the composite element type light detector 17, according to the following equations:

$$F_E = (SA + SC) - (SB + SD) \quad (1)$$

$$T_E = (SC + SD) - (SA + SB) \quad (2)$$

Figure 4:
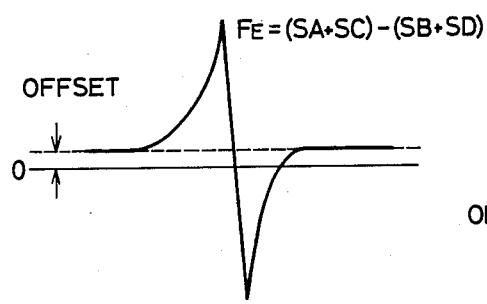
FIG. 4 is a graph showing a waveform of a focus error signal.
Figure 5:
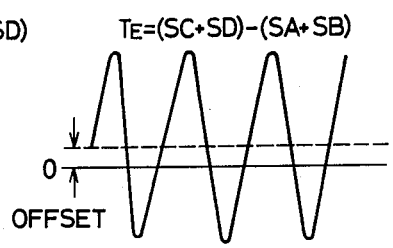
FIG. 5 is a graph showing a waveform of a tracking error signal.

When the stray beam "b" is positioned at such a spot as shown in FIG. 3, the focus error signal $F_E$ and the tracking error signal $T_E$ each have a certain amount of offset as shown in FIGS. 4 and 5.

Where the servo error signals $F_E$ and $T_E$ have offsets, there usually arise such problems as an unstable lead-in of servo operation and a constant deviation of a target point in servo control. As to the latter, it is apparent that in the case where the quantity of light reflected from a recording medium or the quantity of light of transmission varies upon recording or erasing, or in the case of using a recording medium having a different reflectance, a target value in servo control is varied by a change in the quantity of reflected light.

Figure 6:
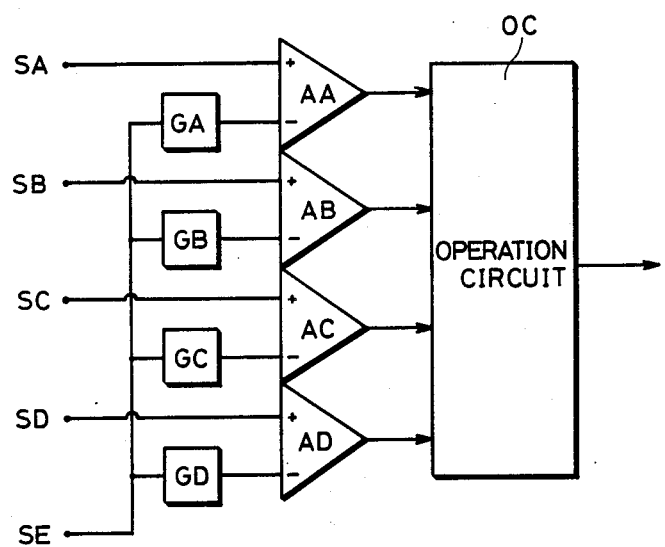
FIG. 6 is a block diagram showing a circuit configuration of a servo control system used in the embodiment of the invention.

In this connection, a servo control system is used in this embodiment. The servo control unit overcomes the above problem by using a monitor output of the light detector 6 which receives a portion of the emitted laser beam. FIG. 6 illustrates a construction of this servo control system, whereby the offset of each of the servo error signals $F_E$ and $T_E$ caused by the stray beam is cancelled. The outputs SA, SB, SC and SD of the four light sensing elements of the composite element type light detector 17 are fed to non-inverted input terminals of four operational amplifiers AA, AB, AC and AD. On the other hand, an output SE of the light detector 6 is fed to four gain adjusters GA, GB, GC and GD, which in turn provides output signals to inverted input terminals of the operational amplifiers AA, AB, AC and AD. Output signals from the operational amplifiers AA, AB, AC and AD are fed to an operation circuit OC, which in turn provides an output signal to a drive unit (not shown) for the objective lens 8 through an amplifier (not shown).

The gain adjusters GA, GB, GC and GD are so set as to cancel according to the output SE of the light detector 6 outputs of levels proportional to the intensities of stray beams incident on the light sensing elements of the composite element type light detector 17, from the outputs SA, SB, SC and SD of the same detector. The operational amplifiers AA, AB, AC and AD add or subtract the outputs SA, SB, SC and SD of the detector 17 with respect to the outputs of the gain adjusters GA, GB, GC and GD and provide the results of the operation to the operation circuit OC. The operation circuit OC performs the operations of the foregoing equations (1) and (2) and outputs an offset-free servo error signal. And the objective lens 8 is controlled in accordance with this servo error signal.

The gain setting in the gain adjusters GA, GB, GC and GD may be performed so that the outputs of the light sensing elements of the composite element type light detector 17 become zero under emission of a predetermined laser beam in the absence of the recording medium 1. And it is performed for each individual optical head.

The invention being thus described, it will be obvious that the same may be varied in many ways Such variations are not to be regarded as a departure from the spirit and scope of the invention, and all such modifications are intended to be included within the scope of the following claims.

What is claimed is:

1. An optical servo system for controlling the position of a light beam relative to an optical recording medium in an optical information retrieval system reading an optical information recording medium comprising:

a coherent light source emitting a coherent light beam;

a beam splitter, positioned between said source and the optical recording medium, said beam splitter allowing at least a major portion of the coherent light beam emitted by said coherent light source to be supplied to said optical recording medium and directing a reflected light beam from said recording medium along a first reflected path away from said coherent light source;

first optical detector means, disposed in said first reflected path, for monitoring a condition of said reflected light beam and generating at least one beam position output signal;

said beam splitter directing a portion of said coherent light emitted from said coherent light source along a second reflected light path different from said first reflected light path;

second optical detector means, disposed in said second reflected path, for receiving a portion of the light beam emitted from said light source and monitoring the intensity of the coherent light emitted from said light source and generating a source intensity signal;

circuit means responsive to said source intensity signal and said at least one beam position output signal for generating a servo error signal free of any offset caused by stray light beams incident on said first optical detection means; and servo means for controlling the position of the light beam in response to said offset-free serve error signal.

2. The system of claim 1 wherein said first and second optical detector means are located on opposite sides of said beam splitter.

3. The system of claim 1 wherein said first and second reflected path extend in mutually opposite direction away from said beam splitter.

4. The system of claim 3 wherein said second optical detector means is inclined at an angle other than 90° to said second reflected path so as to reduce the reflection of stray light therefrom.

5. The system of claim 1 wherein said at least one position error signal comprises a plurality of position error signals.

6. The system of claim 5 wherein said circuit means includes means for scaling said intensity signal and for respectively compensating said plurality of position error signals with the scaled intensity signal during the generation of said servo error signal by cancelling light output levels proportional to the intensities of said stray beam incident on said first detector means.

7. The system of claim 6 and additionally including an objective lens located between the beam splitter and the surface of said recording medium, and wherein said servo system operates to move the objective lens relative to the surface of the recording medium.

8. An optical servo system for controlling the position of an optical beam on the surface of an optical recording medium comprising:

an optical source emitting a coherent light beam;

a beam splitter located in the path of said light beam emitted from said source;

an objective lens located between said beam splitter and said recording medium for positioning the light beam passing through said beam splitter on the surface of said recording medium;

first and second optical detector means located adjacent said beam splitter, said first detector means being responsive to optical energy from the beam splitter being reflected from the recorded medium and comprised of a plurality of sensing elements arranged in quadrature relationship and providing respective first output signals of the incident energy impinging on the sensing elements, said second detector means being responsive to optical energy from the optical source and reflected from the beam splitter and providing a second output signal comprising a portion of the light beam directed to the recording medium, means for scaling said second output signal and providing a scaled second output signal, means for compensating said plurality of first output signals with said scaled second output signal to cancel the effect of stray light beams incident on said first detector means and generating a plurality of third output signals therefrom, circuit means responsive to said third output signals for generating an offset-free servo error signal free of any offset caused by said stray light beams; and servo means coupled to said circuit means and being responsive to said offset-free error signal for controlling the position of said lens relative to the surface of the recording medium.

9. The system as defined by claim 8 wherein said offset-free servo error signal includes a focus error signal generated from the difference between the sum of mutually diagonal quadrature offset signals.

10. The system as defined by claim 8 wherein said offset-free servo error signal includes a tracking error signal generated from the difference between the sum of mutually side-by-side upper and lower quadrature offset signals.

11. The system as defined by claim 8 wherein said second output signal comprises a signal SE;

wherein said plurality of sensing elements comprise four sensing elements (A, B, C and D) providing respective quadrature first output signals of SA, SB, SC and SD, wherein said compensating means comprises means for differencing the output signals SA, SB, SC and SD with the scaled value of signal SE to provide different output signals of SA', SB', SC' and SD', and wherein said circuit means generates a composite offset-free servo error signal including a focus error signal $F_E$ and a tracking error signal $T_E$ which are generated in accordance with the relationship $F_E=(SA'+SC')-(SB'+SD')$ and $T_E=(SC'+SD')-(SA'+SB')$, whereby stray beam effects are obviated.

12. A method for reducing the undesired influence of a stray optical beam on an optical servo system for controlling focusing/tracking in an optical information system employing an optical information recording medium comprising the steps of:

emitting a coherent light beam for use in said optical information system;

reflecting a first portion of said emitted coherent light beam along a reflected path with a beam splitter;

sensing the intensity of said first portion of said beam to develop an intensity signal;

scaling said intensity signal to develop a scaled intensity signal;

reflecting a second portion of the coherent light reflected from the recording medium along another reflected path with said beam splitter;

sensing the intensity of said second portion reflected from the recording medium; generating a plurality of sensed signals therefrom, compensating each of said sensed signals with the scaled intensity signal to cancel the effect of stray beams incident on detector means sensing and generating said plurality of sensed signals and generating a respective plurality of compensated signals; and generating an offset-free servo error signal in response to said compensated signals for driving said optical servo system.

13. The method as defined by claim 12 wherein said offset-free servo error signal comprises a composite error signal including a focus error signal and a tracking error signal.

14. The method as defined by claim 13 wherein said step of generating a plurality of sensed signals comprises the step of generating four quadrature sensed signals.

15. The method as defined by claim 14 wherein said focus error signal is generated by additionally including the step of determining the difference between the sum of mutually diagonal quadrature sensed signals.

16. The method as defined by claim 14 wherein said tracking error signal is generated by additionally including the step of determining the difference between the sum of mutually side-by-side upper and lower quadrature sensed signals.

* * * * *